United States Patent
Hohmann et al.

(10) Patent No.: US 10,857,636 B2
(45) Date of Patent: Dec. 8, 2020

(54) METHOD FOR THE DOCUMENTED TIGHTENING OR TIGHTENING UP OF A SCREW CONNECTION

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 0 days.

(21) Appl. No.: 16/511,183

(22) Filed: Jul. 15, 2019

(65) Prior Publication Data

US 2020/0023477 A1 Jan. 23, 2020

(30) Foreign Application Priority Data

Jul. 17, 2018 (DE) .................. 10 2018 117 256

(51) Int. Cl.
*B23P 19/06* (2006.01)
(52) U.S. Cl.
CPC .................. *B23P 19/067* (2013.01)
(58) Field of Classification Search
CPC .............. B23P 19/067; B25B 29/02
See application file for complete search history.

(56) References Cited

U.S. PATENT DOCUMENTS

| 7,513,178 | B2 | 4/2009 | Hohmann et al. |
| 8,375,554 | B2 | 2/2013 | Wagner et al. |
| 9,248,532 | B2 | 2/2016 | Wagner et al. |
| 9,289,888 | B2 * | 3/2016 | Kastner ................. B23P 19/067 |
| 9,457,439 | B2 * | 10/2016 | Imi ......................... B25B 29/02 |
| 9,878,430 | B2 * | 1/2018 | Hohmann ............... B25B 29/02 |

* cited by examiner

*Primary Examiner* — Rick K Chang
(74) *Attorney, Agent, or Firm* — Gudrun E. Huckett

(57) ABSTRACT

In a method for documented tightening or retightening of a screw connection that includes a threaded bolt and a nut screwed onto the bolt and is supported on a flange surface, an exchangeable socket of a tensioning cylinder supported against the flange surface is screwed onto the free threaded end of the threaded bolt. The exchangeable socket is hydraulically tightened with longitudinal expansion of the threaded bolt while the nut is co-rotated by rotation of a rotary sleeve connected to the nut for conjoint rotation. Switching elements, in a first operating mode, allow only the exchangeable socket to be electrically driven and, in a second operating mode, allow only the rotary sleeve to be electrically driven. A process control unit provided with a documentation module is used to control the method.

8 Claims, 1 Drawing Sheet

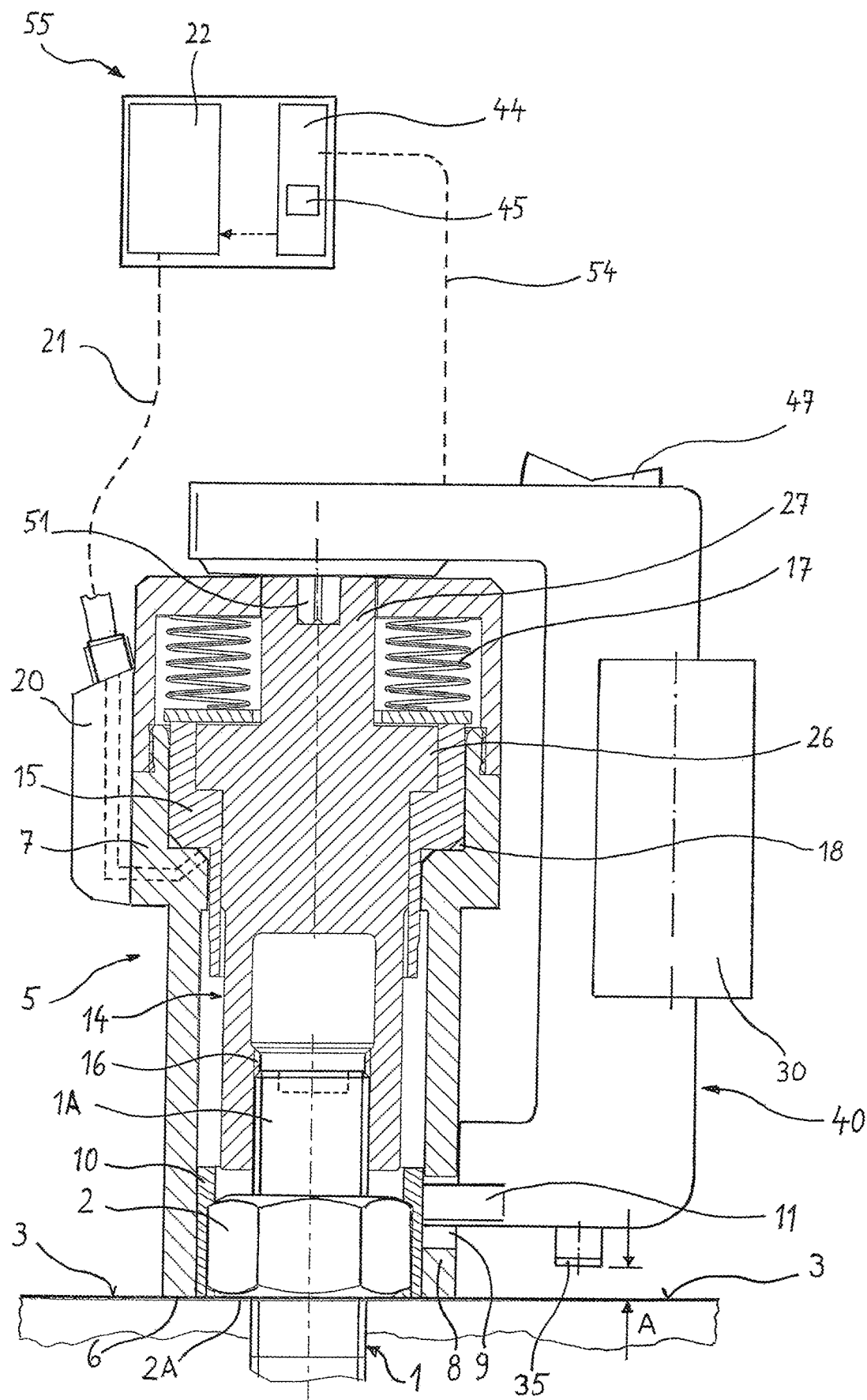

METHOD FOR THE DOCUMENTED TIGHTENING OR TIGHTENING UP OF A SCREW CONNECTION

BACKGROUND OF THE INVENTION

The invention relates to a method for the documented tightening or retightening of a screw connection made up of a threaded bolt and a nut screwed onto the bolt and supported on a flange surface, in which an exchangeable socket of a tensioning cylinder supported against the flange surface is screwed on to the free threaded end of the threaded bolt, the exchangeable socket is hydraulically tightened with longitudinal expansion of the threaded bolt and in the meantime the nut is co-rotated by rotation of a rotary sleeve connected to the nut for conjoint rotation, wherein switching means, in a first operating mode, allow only the exchangeable socket to be electrically driven and, in a second operating mode, allow only the rotary sleeve to be electrically driven.

In methods of this type, as known for example from U.S. Pat. No. 7,513,178, an exchangeable socket is screwed on to the free threaded end of the threaded bolt. This is effected by means of an integrated electric drive. The exchangeable socket is a constituent part of a hydraulically operated tensioning cylinder that is supported against the flange surface, and so it can be tightened by hydraulic force with simultaneous longitudinal expansion of the threaded bolt, while the threaded nut is co-rotated by rotation of a rotary sleeve connected to the nut for conjoint rotation. This co-rotation is also effected by means of the electric drive. With regard to this drive, U.S. Pat. No. 7,513,178 describes a common electric drive motor for rotating the exchangeable socket and for rotating the rotary sleeve. In the process, by appropriately switching a gear connected to a remote control, only the exchangeable socket is driven in a first operating mode and only the rotary sleeve is driven in a second operating mode. Also described is an angle of rotation sensor on the electric drive motor, with the aid of which the engaged length of thread can be checked and a conclusion can be drawn as to the lengthening of the threaded bolt.

Similarly operating screw tensioning devices are known for example from U.S. Pat. Nos. 8,375,554 or 9,248,532.

During the tightening or retightening of such screw connections, the operating parameters that are actually used in the process and general data relating to the particular screwing case are frequently insufficiently documented. These data can be for example the make, the kind or type of threaded bolt or nut, or the utilized tightening moments and torques of the bolts and/or nuts. However, full documentation can especially be highly relevant in screw connections when for example permanent monitoring of the screw connections is necessary and a sufficiently firm screw connection has to be verified for safety reasons, for example in highly pressurized containers, in reactor or storage containers with chemical or nuclear hazardous materials.

In screw tensioning cylinders of this kind, it is necessary, for safety reasons, to ensure a sufficient overlapping length of the threaded connections of the exchangeable socket with the free end of the threaded bolt. If the exchangeable socket engages with the threaded bolt along too short a length, the connection can break. For this reason, measures have already been proposed for sensing the engaged length of thread and for preventing the build-up of hydraulic force in the tensioning cylinder if a predefined value of the engaged length of thread has not been ensured.

The invention is based on the object, when tightening and retightening very firm screw connections by means of axially acting tensioning cylinders, of achieving a high level of operational reliability and of allowing data documentation that is specific to the screwing case with little effort on the part of the operator, said documentation being a prerequisite for the quality and reproducibility of the screwing process.

SUMMARY OF THE INVENTION

This object is achieved by a method having the following features, in which, using a process control unit provided with a documentation module,
a) the screw connection is identified by means of a sensing device arranged on the tensioning cylinder, and an identity feature characterizing the individual screw connection is stored in the documentation module,
b) after the tensioning cylinder has been placed on the screw connection, a distance from the flange surface is sensed by means of a distance sensor arranged on the tensioning cylinder, and a corresponding first distance signal is transmitted to the process control unit,
c) then, in the first operating mode, the exchangeable socket is screwed on to the free threaded end, and the distance from the flange surface is again sensed by means of the distance sensor, and a corresponding second distance signal is transmitted to the process control unit,
d) the process control unit determines, from the difference between the distance signals, the size of the thread engagement between the exchangeable socket and the free threaded end of the threaded bolt, and the process control unit enables switching into the second operating mode only if there is a predefined minimum amount of thread engagement,
e) after switching into the second operating mode, the threaded bolt is longitudinally expanded, and a load value that is characteristic for the tension force acting on the exchangeable socket and/or for the hydraulic pressure applied is stored in the documentation module and assigned to the respective identity feature,
f) during the longitudinal expansion, the rotary sleeve is driven, and the drive torque and/or the angle of rotation covered by the rotary sleeve is stored in the documentation module and assigned to the respective identity feature.

Therefore, the method according to the invention is carried out in essential method steps under the control of an electronic process control unit. Preferably, the latter is arranged in a spatially separate manner from the tensioning cylinder. The communication between the process control unit and the components of the tensioning device takes place by cable or wirelessly. A constituent part of the process control unit is a documentation module, in which the data specific for the screwing case are stored or saved, in order, even after the screwing process has been completed, to be able to check and reproduce the individual screwing process. The documentation makes it possible, for example, to check and to subsequently verify the parameters that are essential for the screwing result and were set while the screwing process was being carried out.

While the method is being carried out, the respective screw connection is identified by means of a sensing device arranged on the tensioning cylinder. The identification can be effected for example by sensing or optically reading an RFID tag, QR code or barcode present on the free end face of the threaded bolt.

After the tensioning cylinder has been placed on the screw connection in a position in which the internal thread of the exchangeable socket just comes into contact with the threaded end of the threaded bolt, without the threads already being engaged, a distance from the flange surface is sensed by means of a distance sensor arranged on the tensioning cylinder. A corresponding distance signal is transmitted as first distance signal to the process control unit. Only then, in the first operating mode of the tensioning cylinder, is the exchangeable socket screwed onto the free threaded end by the electric drive. By means of the distance sensor, the distance from the flange surface is sensed again, and a corresponding second distance signal is transmitted to the process control unit. From the difference between the two distance signals, the processor of the control unit calculates the length, achieved by the screwing on, of the thread engagement between the exchangeable socket and the free threaded end of the threaded bolt.

Only when the processor calculates an achieved length of the thread engagement that has at least the size of a predefined minimum amount of thread engagement demanded for safety reasons does the process control unit enable switching into the second operating mode, or allow such switching. This switching, which can take place automatically or alternatively manually, is a prerequisite for the subsequent hydraulic pressure build-up in the tensioning cylinder.

Once switching into the second operating mode has been effected, the actual tensioning process is started, i.e. the threaded bolt is, as is conventional in such tensioning cylinders, expanded or stretched in the bolt longitudinal direction. The operating parameters that are used or set in the process are stored in the documentation module and in this way documented for test purposes. Among other things, a tensile force acting on the exchangeable socket and/or the hydraulic pressure applied is stored as characteristic load value in the documentation module and assigned to the respective identity feature of the screw connection and thus allotted to a common dataset.

While the longitudinal expansion is being maintained, the rotary sleeve is furthermore driven by means of the electric drive, and the torque applied in the process and/or the angle of rotation covered by the rotary sleeve is likewise stored in the documentation module and assigned to the respective identity feature of the screw connection.

It is advantageous when, in the first operating mode, the exchangeable socket is screwed on initially at a predefined speed and/or with a predefined torque and subsequently at a reduced speed compared therewith and/or with a reduced torque, preferably at an increasingly reduced speed and/or with an increasingly reduced torque. In this way, undesirably high force pulses when the last turns of the exchangeable socket are screwed on are avoided, with the result that the life of the exchangeable socket is increased and generally the components of the tensioning cylinder are protected from excessively high pulse stresses.

The reduction in speed or torque is monitored by appropriate data processing and data evaluation in the process control unit, the speed or the torque being controlled by the process control unit, specifically in a manner depending on the constantly updated distance signals that are sensed during the screwing on of the exchangeable socket and are supplied by the distance sensor.

In practice, the quality and the reproducibility of the screw tensioning process are also influenced by environmental conditions, for example by surfaces that are not actually planar and smooth, or by the presence of foreign bodies in the region of the bearing and supporting surfaces of the nut and of the tensioning cylinder.

Therefore, it is advantageous for the quality and the reproducibility of the screw tensioning process to carry out a zero adjustment before the actual tensioning process, in order subsequently to achieve more exact stress levels or to be able to sense these for documentation. For this purpose, with one configuration of the method, it is proposed that, after switching into the second operating mode, the following method steps proceed automatically and as follows in a manner controlled by the process control unit:

first of all a hydraulic preliminary force is built up, which, at for example 100 bar, amounts to only 2% to 12% of the hydraulic end force achieved in the rest of the method, the rotary sleeve is driven until the nut bears against the flange surface, wherein the resultant rotary position of the rotary sleeve is sensed and stored as an initial angle of rotation value, the hydraulic end force, for example 1500 bar, is built up, the rotary sleeve is driven again until the nut bears against the flange surface again, and in the process the angle of rotation covered by the rotary sleeve compared with the initial angle of rotation value is sensed. The angle of rotation achieved in this way is likewise saved, as the result of the screw tensioning process, in the documentation module with the other data of the dataset specific for the screw connection.

Together with the operating data of the respective screw connection, it is also possible for further data that are important for the subsequent reproducibility to be stored in the documentation module and assigned to the respective identity feature. For example, the date on which the screwing process was carried out can likewise be contained in the dataset.

The exchangeable socket and the rotary sleeve are driven either by a single, i.e. common electric motor, or by two separate electric motors. If the exchangeable socket and the rotary sleeve are electrically driven by one and the same electric motor, a mechanical switching gear is provided, which adopts its first switched position in the first operating mode and its second switched position in the second operating mode, and in the first operating mode ensures that the exchangeable socket is driven and in the second operating mode ensures that the rotary sleeve is driven.

Alternatively, the exchangeable socket and the rotary sleeve can be electrically driven by two separate electric motors. In this case, the process control unit is configured in terms of signalling to enable either only one or only the other electric motor depending on the operating mode.

Preferably, the electric motor, the switching gear and the distance sensor are not located directly in the usually highly pressure-resistant metal housing of the tensioning cylinder, but rather are combined structurally in a plug-on module that is connected firmly to the actual tensioning cylinder. The plug-on module is placed on the actual tensioning cylinder and combines the functions of switching between the two operating modes, electrically driving the exchangeable socket and the rotary sleeve in rotation, and also the function of the distance sensor, which senses the distance from the respective base. The plug-on module is also suitable for retrofitting on already existing tensioning cylinders.

BRIEF DESCRIPTION OF THE DRAWING

Further details and advantages will become apparent from the following description of an exemplary embodiment illustrated in the drawing.

The only FIGURE shows a screw tensioning device, reproduced partially in section and partially in side view, including a hydraulic tensioning cylinder and the highly schematically reproduced peripheral elements that are necessary for carrying out the screw tensioning method.

DESCRIPTION OF PREFERRED EMBODIMENTS

Illustrated in the drawing is a hydraulically operated screw tensioning cylinder 5. The latter serves for tightening, especially retightening, and optionally also loosening a screw connection made up of a threaded bolt 1, forming a threaded element, and a threaded nut 2 that has been screwed onto the thread of the threaded element 1 and is supported on a flange surface 3.

The tensioning cylinder 5 is illustrated in its operating position before the application of hydraulic pressure. In this position it has already been lowered to such an extent that it is supported with its underside 6 on the preferably planar flange surface 3 on which the nut 2 is also supported with its contact surface 2A.

By way of the tensioning cylinder 5, a pretensioning force can be applied to the threaded bolt 1 in the longitudinal direction of the bolt, with the result that the threaded bolt 1 expands somewhat in the longitudinal direction. While this expansion is being maintained, the threaded nut 2 is tightened or retightened.

An exchangeable socket 14 arranged in a rotatable manner in a cylinder housing 7 of the tensioning cylinder 5 is provided at one end with an internal thread 16. By way of this thread, before the start of the tensioning process, the exchangeable socket 14 is screwed, by rotation of the exchangeable socket 14, onto that free threaded end portion 1A of the threaded element 1 that projects upwardly beyond the nut 2. The screwing on of the exchangeable socket 14 is accompanied by corresponding lowering of the entire tensioning cylinder 5 until the underside 6 bears on the flange surface 3, since the exchangeable socket 14 has only a little longitudinal play, if any, relative to the cylinder housing 7.

Subsequently, the exchangeable socket 14 screwed to the threaded element 1 in this way is put hydraulically under tension, with the result that the screw connection expands in the longitudinal direction. The contact surface 2A of the threaded nut 2 comes away as a result, and so the threaded nut 2 can then rotate with only a little rotational resistance and in this way can be tightened or retightened against the base, i.e. against the flange surface 3 or optionally against a washer.

The hydraulic tensioning mechanism is located in the pressure-resistant cylinder housing 7. This can also be assembled in a modular manner from a plurality of cylinder portions. The rigid continuation of the cylinder housing 7 is a support tube 8. The latter is either, as illustrated, itself part of the cylinder housing 7 or a separate component. The support tube 8 is open towards the screw connection, surrounds the threaded nut 2 and is supported with its underside 6 against the base or flange surface A. The base 3 therefore forms the abutment during the tensioning process. The tensioning process takes place by tension of the exchangeable socket 14 on the threaded end portion 1A, wherein, in order to retighten the nut 2, the latter is screwed downwards until it bears firmly against the base 3 again with its contact surface 2A.

The support tube 8 is provided towards one side with an opening 9 of such a size that the nut 2 is rotatable through the opening 9 in order to retighten the nut. This is of course only possible when the hydraulic tensioning device is working at the same time and therefore the nut 2 is not stressed by considerable friction. The threaded nut 2 is rotated by means of a rotary sleeve 10 which surrounds the nut in a form-fitting manner and is rotatably mounted in the support tube 8. The rotary sleeve 10 is driven via a gear 11, which is arranged laterally on the support tube 8 and works through the opening 9 in the latter.

The cylinder housing 7 is provided on the outside with a hydraulic port 20, via which a hydraulic working chamber 18 in the interior of the tool is connected to a strong hydraulic pump 22 via a flexible but pressure-resistant hydraulic line 21. The hydraulic pump 22 is arranged separately from the screw tensioning cylinder 5 in an external supply module 55, which is reproduced only very schematically in the drawing.

Via the hydraulic port 20, hydraulic fluid under high pressure passes into the working chamber 18, with the result that a piston 15 mounted in a longitudinally movable manner in the cylinder housing 7 is subjected to hydraulic pressure. As a result, the piston 15 is pushed up. This takes place counter to the force of a spring 17 acting on the piston 15. The spring 17 serves as a piston restoring spring and subjects the piston 15 to a force that is intended to keep the piston 15 in its basic position, in which the hydraulic working chamber 18 has its smallest volume.

The piston 15 annularly surrounds the exchangeable socket 14. The piston 15 is sealed off towards the outside with respect to the cylinder housing 7 and is provided on the inside with an encircling step that forms an entrainment surface on which the exchangeable socket 14 is supported with a radially widened portion 26. As a result, the exchangeable socket 14 is able to be entrained by the piston 15. Without pressurization, the exchangeable socket 14 is freely rotatable with respect to the piston 15 and with respect to the cylinder housing 7.

The exchangeable socket 14, like the piston 15, is located centrally on the longitudinal axis of the cylinder housing 7 and is put together successively from a portion with the internal thread 16, which is screwed onto the threaded end portion 1A of the threaded bolt 1, from the radially widened portion 26, and from a drive portion 27. The drive portion 27 is provided with a square drive, in which a shaft of an electric drive that is operated depending on control signals from a process control unit engages, in order in this way to rotate the exchangeable socket 14 about its longitudinal axis and either to screw it, before the tensioning process, onto the threaded end portion 1A, with simultaneous lowering of the cylinder housing 7, or, after the tensioning process, to unscrew it from the threaded end portion 1A again, with simultaneous lifting of the cylinder housing 7.

At the earliest when it has been ensured that the exchangeable socket 14 has been screwed on to the threaded end portion 1A with a sufficiently long thread engagement, the hydraulic tensioning process may be started. In order to verify this, the screw tensioning device has, inter alia, a distance sensor 35. The latter is configured and rigidly fastened to the tensioning cylinder 5 itself or to a plug-on module 40 such that it senses the distance A from the fixed base 3.

Once the tensioning cylinder 5 has been positioned on the axis of the respective screw connection such that the end of the internal thread 16 comes into contact or virtually into contact with the end of the threaded end portion 1A, without a screw connection already having been produced, the distance sensor 35 senses the distance A, present in this situation, from the flange surface 3. A corresponding first distance signal A1 is transmitted to the process control unit 44 by the sensor 35.

Then, still in the first operating mode of the screw tensioning device, the exchangeable socket 14 is screwed on to the threaded end 1A in an electrically driven manner. Once this has taken place, the distance A from the flange surface 3 is again sensed by the distance sensor 35, and a correspondingly smaller, second distance signal A2 is transmitted to the process control unit 44. The process control unit 44 determines, from the difference A1 minus A2 between the distance signals, the length of the thread engagement between the internal thread 16 of the exchangeable socket 14 and the free threaded end 1A of the threaded bolt.

Only when the process control unit 44 calculates the presence of a minimum amount of thread engagement, predefined internally in the control unit, from the difference between the distance signals A1, A2 does it enable effective switching from the first operating mode into a second operating mode. The enabling is displayed to the operator, such that he can effect the switching manually, preferably by actuating a hand switch 47 that is located on the plug-on module 40 that is firmly connectable to the tensioning cylinder 5.

The motor-driven screwing on of the exchangeable socket 14 takes place while being monitored by and depending on control signals from the process control unit 44.

In the second operating mode, and only in the latter, the hydraulic pump 22 is enabled to build up hydraulic pressure in the working chamber 18 of the tensioning cylinder via the hydraulic line 21 on account of corresponding hydraulics control signals from the process control unit 44. Furthermore, in the second operating mode, the electric drive or electric drives is/are connected in the plug-on module 40 such that the rotary drive of the exchangeable socket 14 is blocked and only the rotary drive of the rotary sleeve 10 is enabled.

This is because although, for the actual tensioning process, the screw tensioning cylinder 5 operates hydraulically, for semi-automatic operation of the tensioning cylinder, an electric drive 30 or alternatively two electric drives is/are additionally present. The drive 30 or alternatively the two drives also operate(s) depending on control signals from the process control unit.

If there are two electric drives, the first drive motor drives only the exchangeable socket 14 arranged in a rotatable manner in the screw tensioning cylinder. The second drive motor in this case drives only the rotary sleeve 10, in order to rotate the threaded nut 2. For safety reasons, circuitry in the control unit 44 causes either only one or only the other drive motor to be electrically activated depending on the operating mode set.

The same switching logic is achieved, when a common drive motor 30 is used, by a mechanical switching gear that is switched by the user by means of the hand switch 47. The switching gear is located in the drive path that leads from the output shaft of the drive motor 30 to the exchangeable socket 14 for the one part and to the rotary sleeve 10 for the other. The switching gear enables only the drive path to the exchangeable socket 14 in the first operating mode and only the drive path to the rotary sleeve 10 in the second operating mode. The respectively other drive path is blocked or passive for safety reasons.

The switching gear and the electric motor 30 are located in the plug-on module 40, which has been placed on the actual tensioning cylinder 5 of pressure-resistant construction. Preferably, the distance sensor 35, which detects the distance A from the support surface or flange surface 3, is likewise arranged in the plug-on module 40.

Within the plug-on module 40, drive paths lead from the electric motor 30 via the switching gear to the exchangeable socket 14 of the tensioning cylinder and to the rotary sleeve 10 of the tensioning cylinder. The rotational coupling to the exchangeable socket 14 and to the rotary sleeve 10 takes place in each case via polygonal connections 51, such that the plug-on module 40 is able to be placed on the actual tensioning cylinder 5 without great effort.

A further constituent part of the plug-on module 40 is the abovementioned, manually actuatable switch 47, with which the operator can switch between the first and the second operating mode. Preferably, a switch component or sensor that informs the process control unit 44 of the position of the switch 47 is located on the switch 47.

Since the housing of the plug-on module 40 is fixed rigidly to the cylinder housing 7, this ensures, for the distance sensor 35, that the distance values A sensed thereby are representative of the respective height positions of the tensioning cylinder 5.

However, the distance sensor 35 could also be positioned in some other location, as long as this position is a fixed position with respect to the cylinder housing 7 of the tensioning cylinder 5. For example, it is possible to arrange the distance sensor 35 directly in the support tube 8 of the cylinder housing 7, with the result that distance measuring as close as possible to the contact surface 2A of the threaded nut 2 would be achieved.

A signal line 54 connects the plug-on module 40 to the externally arranged supply module 55, in which the hydraulic pump 22 together with its hydraulic controller, the process control unit 44 and, as a constituent part of the process control unit, the documentation module 45 for the process data are combined. The signal line 54 can additionally supply the electric motor 30 or electric motors with operating voltage.

In as much as the signal line 54 serves for signal transmission, the latter can also be carried out wirelessly by corresponding transmitter and receiver devices being present on the plug-on module 40 for the one part and on the external module 55 for the other part.

The specification incorporates by reference the entire disclosure of German priority document 10 2018 117 256.7 having a filing date of 17 Jul. 2018.

While specific embodiments of the invention have been shown and described in detail to illustrate the inventive principles, it will be understood that the invention may be embodied otherwise without departing from such principles.

LIST OF REFERENCE SIGNS

1 Threaded bolt
1A Threaded end portion
2 Threaded nut, nut
2A Contact surface of threaded nut
3 Flange surface, base
5 Tensioning cylinder
6 Underside
7 Cylinder housing
8 Support tube
9 Opening
10 Rotary sleeve
11 Gear
14 Exchangeable socket
15 Piston 16 Internal thread
17 Spring
18 Hydraulic working chamber
20 Hydraulic port
21 Hydraulic line
22 Hydraulic pump
26 Radial widened portion
27 Drive portion
30 Drive, electric motor
35 Distance sensor
40 Plug-on module
44 Process control unit
45 Documentation module
47 Hand switch, switch
51 Square connection
54 Signal line
55 External module
A Distance

What is claimed is:

1. A method for a documented tightening or retightening of a screw connection comprised of a threaded bolt and a nut screwed onto the threaded bolt and supported on a flange surface, wherein an exchangeable socket of a tensioning cylinder supported against the flange surface is screwed onto a free threaded end of the threaded bolt, the exchangeable socket is hydraulically tightened with longitudinal expansion of the threaded bolt and the nut is co-rotated by rotation of a rotary sleeve connected to the nut for conjoint rotation, wherein switching means, in a first operating mode, allow only the exchangeable socket to be electrically driven and, in a second operating mode, allow only the rotary sleeve to be electrically driven, wherein the method employs a process control unit provided with a documentation module and the method comprises the steps of:

a) identifying the screw connection by a sensing device arranged on the tensioning cylinder and storing an identity feature characterizing the screw connection in the documentation module,
   b) placing the tensioning cylinder on the screw connection, subsequently sensing a first distance by a distance sensor arranged on the tensioning cylinder relative to the flange surface, and transmitting a corresponding first distance signal to the process control unit,
   c) subsequently, in the first operating mode, screwing the exchangeable socket onto the free threaded end and sensing a second distance by the distance sensor relative to the flange surface, and transmitting a corresponding second distance signal to the process control unit,
   d) determining in the process control unit, from a difference between the first and second distance signals, a size of a thread engagement between the exchangeable socket and the free threaded end of the threaded bolt, and enabling switching by the process control unit into the second operating mode only if there is a predefined minimum amount of thread engagement,
   e) after switching into the second operating mode, expanding the threaded bolt longitudinally and storing a load value, characteristic of a tension force acting on the exchangeable socket and/or of an applied hydraulic pressure, in the documentation module and assigning the load value to the identity feature,
   f) during longitudinally expanding in step e), driving the rotary sleeve and storing in the documentation module a drive torque and/or an angle of rotation covered by the rotary sleeve and assigning the drive torque and/or the angle of rotation to the identity feature.

2. The method according to claim 1, wherein the step a) of identifying the screw connection includes sensing an RFID tag, a QR code or a barcode present on the threaded bolt.

3. The method according to claim 1, wherein the step a) of identifying the screw connection includes recording the date and assigning the date to the identity feature.

4. The method according to claim 1, wherein the step c) includes screwing on the exchangeable socket initially at a predefined speed and/or at a predefined torque and subsequently at a reduced speed and/or at a reduced torque.

5. The method according to claim 4, further comprising controlling an amount by which the predefined speed or the predefined torque is reduced to the reduced speed and/or to the reduced torque by the process control unit depending on the first and second distance signals.

6. The method according to claim 1, wherein, after switching into the second operating mode in step e), the following method steps proceed automatically and controlled by the process control unit as follows:
   building up a hydraulic preliminary force which amounts to only 2% to 12% of an hydraulic end force achieved finally when performing the method,
   driving the rotary sleeve until the nut bears against the flange surface, sensing a resultant rotary position of the rotary sleeve, and storing the resultant rotary position as an initial angle of rotation value,
   building up the hydraulic end force,
   driving the rotary sleeve again until the nut bears against the flange surface and sensing an angle of rotation that has been covered by the rotary sleeve compared to the initial angle of rotation value.

7. The method according to claim 1, further comprising driving the exchangeable socket and the rotary sleeve electrically by one and the same electric motor and via a switching gear that adopts a first switched position in the first operating mode and a second switched position in the second operating mode.

8. The method according to claim 1, further comprising driving the exchangeable socket and the rotary sleeve electrically via two separate electric motors and, depending on the operating mode, enabling by the process control unit only one or the other of the two electric motors.

* * * * *